T. L. VALERIUS.
APPARATUS FOR TREATING MILK AND CREAM OR THE LIKE.
APPLICATION FILED NOV. 10, 1913.
1,088,113.
Patented Feb. 24, 1914.
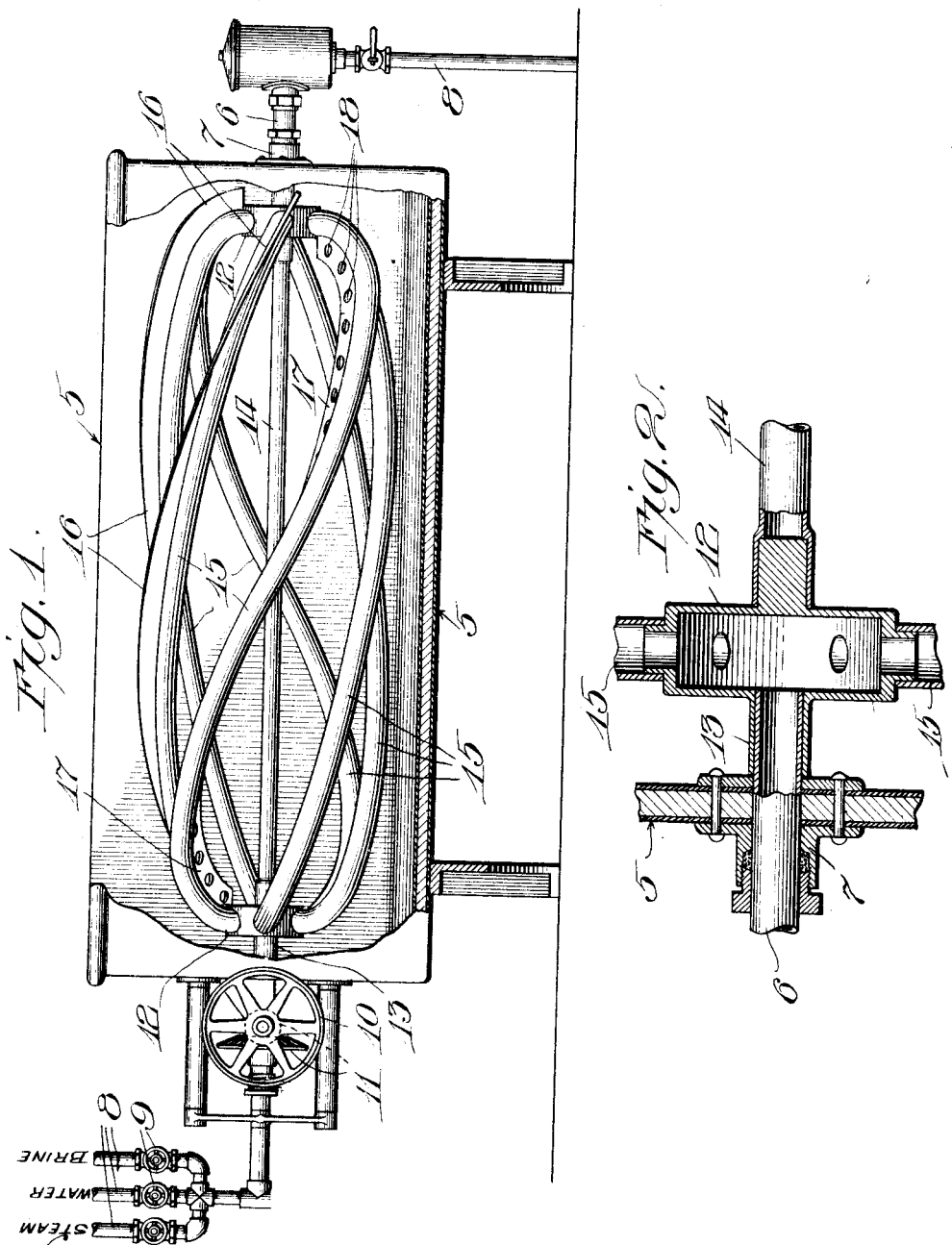

UNITED STATES PATENT OFFICE.

THEODORE L. VALERIUS, OF FORT ATKINSON, WISCONSIN, ASSIGNOR TO CREAMERY PACKAGE MANUFACTURING CO., OF CHICAGO, ILLINOIS, A CORPORATION OF ILLINOIS.

APPARATUS FOR TREATING MILK AND CREAM OR THE LIKE.

1,088,113. Specification of Letters Patent. Patented Feb. 24, 1914.

Application filed November 10, 1913. Serial No. 800,065.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Apparatus for Treating Milk and Cream or the like, of which the following is a specification.

This invention relates to the art of treating milk and cream or the like and refers to that type of machine which comprises a vat having mounted therein a hollow rotary structure adapted to conduct a tempering fluid, said structure acting to mix, agitate and temper the liquid in the vat. Such a machine may be used for pasteurizing; for heating, cooling and mixing in the process of ripening cream; for emulsifying or mixing skimmed milk and butter oil; for mixing and treating ice cream custard preparatory to freezing; and for other similar purposes.

The present invention contemplates an agitating and tempering device of novel and improved construction.

One style of rotary tempering device heretofore employed in machines of the character mentioned consists of a single length of pipe spirally coiled at a relatively low pitch so that the individual coils will be spaced only a short distance apart and will form, in effect, a hollow cylinder which is mounted in the vat to rotate on its axis. An example of such a structure is to be found in my prior Patent No. 933,934, issued September 14, 1909. In this form of device the tempering fluid passes in a single path through the device, following the coil of pipe in its convolutions.

The objects of the present invention are to produce an improved tempering device having a plurality of independent paths through which the tempering fluid may flow; to effect a more even distribution or absorption of heat by the tempering device throughout the body of cream in the vat; to provide a tempering device in which the total length of pipe comprised in the device is materially reduced without loss of efficiency; to so arrange the tempering pipes as to effect a thorough agitation, mixing and circulation of the cream; to provide a further means in addition to the tempering pipes themselves for agitating, circulating, smoothing and emulsifying the cream; and, lastly, to provide a simple structure by which all of the above named objects are accomplished.

Without intending to limit the invention to the precise form herein disclosed, the description will now proceed to the details of construction of the preferred form of the invention.

In the accompanying drawings Figure 1 is a side elevation of a machine embodying the features of my invention, one of the sides of the machine being broken away to show the agitating and tempering device. Fig. 2 is a detail section through one of the distributing heads.

The machine comprises, as is usual, an elongated vat 5, which may be of any common or preferred construction, the bottom of the vat preferably being concave in form. The rotary agitating and tempering device is disposed longitudinally within the vat. This device comprises a pair of hollow shafts 6 which are mounted in suitable stuffing-box bearings 7 in the end walls of the vat, and are arranged to conduct tempering fluid to and away from the body portion of the tempering device. The outer ends of these central shafts are connected up with suitable pipes 8 which are controlled by valves 9 so that either steam or cold water or brine may be circulated through the tempering device in a manner now well known. The tempering device is rotated by a drive belt (not shown) running over a pulley 10 which is geared by bevel gears 11 to the shaft 6 at the head end of the machine. A pair of hollow distributing heads 12 have their hubs 13 fixed on the inner ends of the central shafts 6, so that said heads communicate with the interior of said shafts. The inner sides of the heads 12 are closed, and the heads are rigidly connected by a shaft 14 which is alined with the shafts 6.

A plurality of independent hollow pipes 15 (in the present instance six in number) are attached to and communicate at their opposite ends with the distributing heads 12. These pipes afford a plurality of separate paths through which the tempering fluid passes from end to end of the machine. By this means the effective space in the vat within which the tempering fluid acts is increased because the warming or cooling is not localized so much at the inlet end of the tempering device as is the case in a single or continuous coil machine.

The individual pipes 15 are spirally twisted, but the amount of such twist, in the preferred form of the invention, is less than a full turn, so that while the pipes extend in a direction around the tempering device to a certain degree, the general disposition of said pipes is in a direction longitudinal of the machine, as distinguished from the transverse disposition of the coils in my patent above referred to. The spiral twist of the pipes in the present machine is sufficient to insure the desired longitudinal or end to end circulation of the cream in the vat, and at the same time, by reason of the spacing and longitudinal disposition of the pipes, the latter act to thoroughly agitate and mix the contents of the vat. The arrangement herein shown also minimizes the amount of pipe necessary for the efficient working of the machine.

When the machine is used for certain operations, as for example for ripening cream, or for mixing and treating ice cream custard preparatory to freezing, it is desirable to provide means in addition to the pipes themselves for mixing, smoothing and emulsifying the liquid, in order to bring it to a more uniform consistency. To this end I have provided on one or more of the spiral pipes an outwardly extending rib or vane 16 which runs from end to end of the pipe and is disposed sidewise with respect to the direction of its travel, so that the rib acts to smooth and emulsify cream to be ripened and to break up clots therein, as well as to assist in causing longitudinal and transverse currents in the body of the cream. This outer rib 16 is arranged to travel close to the bottom of the vat, and in the operation of treating ice cream mix, said rib acts to pick up sugar and any other heavy ingredients from the bottom of the vat and insure the proper mixture thereof through the custard.

A rib or vane 17 similar to the one just described may also be provided at the inner side of one or more of the spiral pipes, and either or both of said ribs may have a suitable number of openings 18 therethrough so as to cause a further mixing and agitation of the liquid. These ribs are preferably welded or otherwise rigidly affixed at their inner edges to the pipes. The ribs may be secured to one or more of the pipes and in any desired arrangement.

When the tempering device is rotated, the spiral pipes 15 and the ribs thereon will cause currents in the liquid to flow longitudinally from end to end of the machine as well as transversely thereof and axially about the tempering device. In this way all of the liquid will be thoroughly mixed and uniformly brought into contact with the rotary pipes and heads, so that a uniform degree of heat will be imparted to or abstracted from the liquid, and every part of the cream will be uniformly pasteurized or ripened, or otherwise tempered, as the case may be.

I claim as my invention:

1. An apparatus for treating milk and cream or the like comprising a vat and an agitating and tempering structure rotatably mounted therein, said structure consisting of a hollow central device and a plurality of independent pipes fixed at their opposite ends to and communicating with said central device, said pipes being spirally twisted less than a full turn so as to extend in a direction generally longitudinal of the machine.

2. An apparatus for treating milk and cream or the like comprising a vat and an agitating and tempering structure rotatably mounted therein, said structure comprising a hollow tempering fluid supply head and a plurality of independent pipes communicating at one end with and fed from said supply head, said pipes being spirally twisted but extending in a general longitudinal direction from end to end of the structure.

3. An apparatus for treating milk and cream or the like comprising a vat and an agitating and tempering structure rotatably mounted therein, said structure comprising a spirally twisted pipe and a longitudinal rib on said pipe disposed sidewise to the path of movement thereof, and means for supplying a tempering fluid to said pipe.

4. An apparatus for treating milk and cream or the like, comprising a vat and an agitating and tempering structure rotatably mounted therein, said structure comprising a spirally twisted pipe arranged to conduct tempering fluids, and a rib carried by and running longitudinally of said pipe, said rib having a plurality of openings therethrough to mix and agitate the liquid.

5. An apparatus for treating milk and cream or the like, comprising a vat and an agitating and tempering structure rotatably mounted therein, said structure comprising a central hollow shaft, a pair of distributing heads fixed to and communicating with said shaft at opposite ends of the vat, a plurality of independent spirally twisted pipes all communicating at opposite ends with said heads, and spiral agitating ribs carried by one or more of said pipes and running longitudinally thereof.

In testimony whereof I affix my signature in presence of two witnesses.

THEODORE L. VALERIUS.

Witnesses:
 IRVING R. HIPPENMEYER,
 L. A. FORSYTH.